March 22, 1949.   R. H. MECKLEY   2,465,167
DRAFTING TEMPLATE
Filed Aug. 28, 1946   2 Sheets-Sheet 1
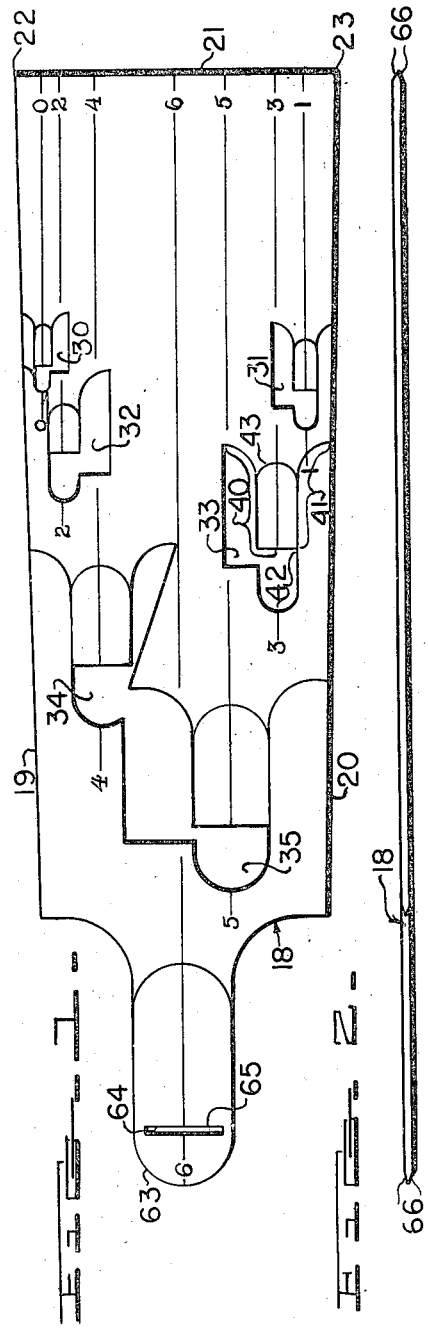
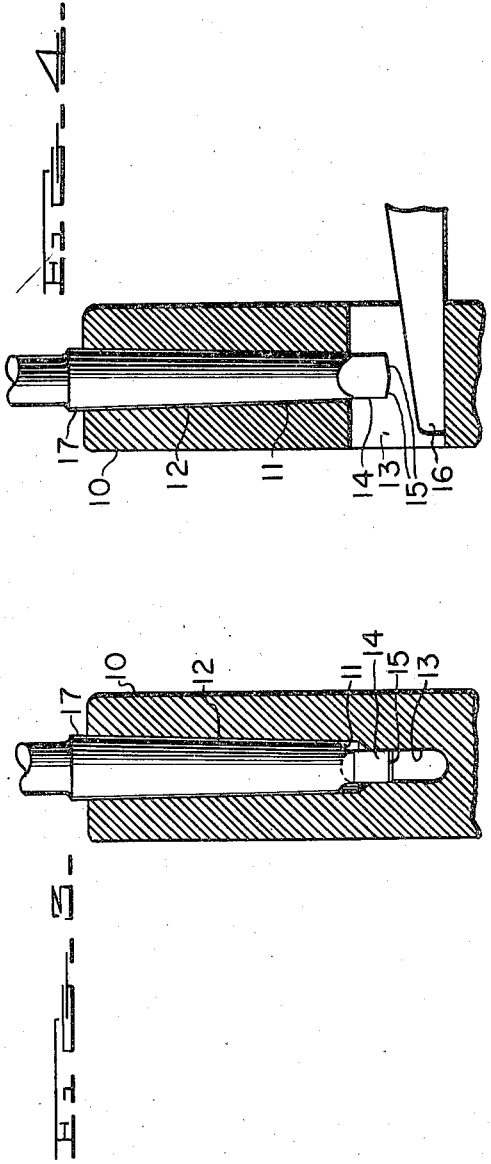
Inventor
Raymond H. Meckley
By
Attorney.

March 22, 1949. R. H. MECKLEY 2,465,167
DRAFTING TEMPLATE
Filed Aug. 28, 1946 2 Sheets-Sheet 2
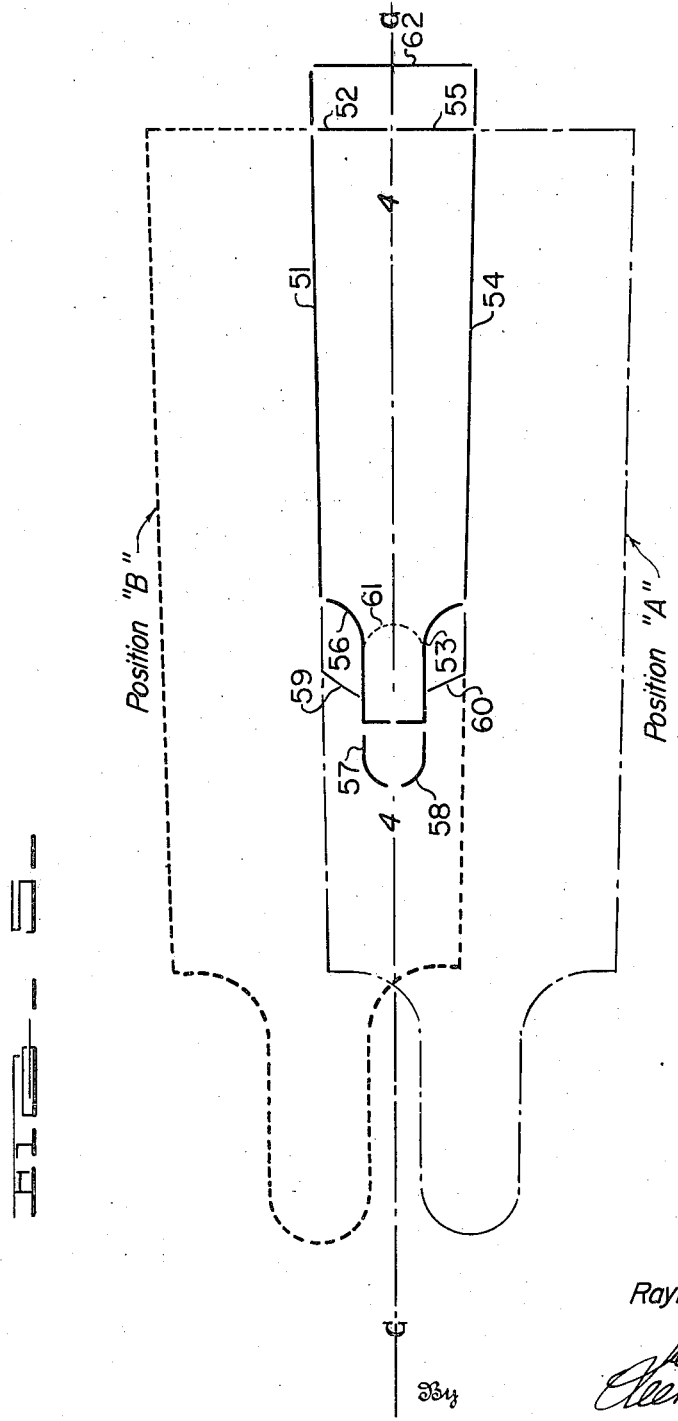
Inventor
Raymond H. Meckley
By
Attorney.

Patented Mar. 22, 1949

2,465,167

UNITED STATES PATENT OFFICE 2,465,167

DRAFTING TEMPLATE

Raymond H. Meckley, York, Pa., assignor of three-fifths to Harry R. Huling, York, Pa.

Application August 28, 1946, Serial No. 693,498

2 Claims. (Cl. 33—174)

This invention pertains to drafting instruments and more particularly to a draftman's template for drawing a plurality of sizes of machine tool shanks and sockets all of which have substantially the same taper.

A general description of a machine tool shank and socket will be helpful at this point. Machine tool shanks, of the type with which this invention is concerned, usually are circular in cross section and taper uniformly toward one end, on which is formed a tongue. The tongue fits into a cooperating slot formed in the bottom of the socket of the corresponding machine tool holder. The sides of the socket in contact with the uniformly tapering sides of the tool shank are correspondingly tapered. The tool holder also has a transverse keyway therethrough which forms the slot and extends somewhat below the bottom of the tongue of the inserted tool so that the tool may be removed easily by means of a wedge-shaped key.

Each machine tool usually is provided with a standard size shank. There are a plurality of standard sizes for shanks, depending on the size of the tool and the manufacture thereof. Usually each manufacturer of machine tools has a set of standard sizes for shanks for use with tools of varying size. All the shanks in a set of standard size shanks have a substantially uniform taper. In the case of Morse standard size shanks, for example, each size is designed by a taper number. The taper of Morse standard size shanks varies from .5986 inch per foot for No. 1 taper, to .6315 inch per foot for No. 5 taper. Accordingly, the angular taper variation is a matter of a few minutes, which is so small an angular variation that it need not be taken into consideration in drawing machine tool shanks and sockets of standard size. Hence, one template may be used to lay out all the tool shanks and corresponding sockets for a set of standard sizes.

In drawing machine tools, draftsmen frequently have occasion to lay out or draw a standard size shank with or without the corresponding socket. This necessitates either careful angular measurements or the use of a template having a periphery with outline characteristics the same as those of the tool shank or socket to be drawn. Careful angular measurements obviously consume time and are subject to error. The use of a template obviously is an improvement, but heretofore a template had to be provided for each tool shank or socket of standard size. Such a plurality of templates for each set of standard size shanks or sockets not only is an added expense, but also adds to the bulk of a draftsman's equipment.

Accordingly, it is an object of this invention to provide a single template having a plurality of apertures or cut-outs so arranged that any size machine tool shank and/or socket in a set of standard sizes may be drawn.

It is another object of the invention to provide a template which will speed up the drawing of standard size machine tool shanks and sockets.

Other objects and advantages of the invention will be apparent from the following description and accompanying drawings in which:

Figure 1 is a plan view of the template.

Figure 2 is a side elevational view of the template.

Figure 3 is a front elevational view in cross-section of the socket end of a machine tool holder with the shank of the corresponding tool inserted therein.

Figure 4 is a side view corresponding to Figure 3.

Figure 5 is a diagrammatic view of the successive positions of the template in drawing a tool shank or socket.

Referring now to Figures 3 and 4 for a description of a tool shank and holder, it will be seen that the tool holder 10 is provided with a socket 11, the major portion of which is circular in cross-section. The diameter of the socket uniformly decreases from the outer end to the bottom thereof. Thus, the sides of the socket 11 taper uniformly from top to bottom to receive the shank 12 of a tool having correspondingly tapered sides. A keyway 13 passes transversely through the tool holder 10 and extends somewhat above and below the bottom of the socket 11. The keyway forms an opening in the bottom of the socket 11 in the nature of a slot in which fits the tongue 14 of the shank 12. The interfitting tongue 14 and slot formed by the keyway 13 prevent relative rotation between the holder 10 and the shank 12 of a tool when the latter is in use. The bottom of the tongue 14 is slightly beveled on both sides as at 15 so as to enable the ready removal of the tool from the socket 11 by means of a wedge-shaped key 16, as illustrated in Figure 4. When fully inserted, the tapered sides of the tool shank project slightly out of the outer end of the socket 11 as at 17. The distance which the tapered sides of the shank project out of the socket varies with the size of the tool shank 12.

Referring now to Figures 1 and 2, the template 18 is shown as a flat plate-like member made of suitable material, such as plastic, for example Lucite, glass, Celluloid, metal, cardboard, etc. A substantially transparent plastic material is preferred because modern plastics have both resistance to breakage and resistance to deformation in use. The template 18 has two opposite straight edges 19 and 20 which diverge toward and intersect a third straight edge 21, at angles complementary to the angle of taper of the set of standard size tool shanks and sockets for which the template 18 is designed. A series of parallel straight indicia lines 0—0, 1—1, 2—2, 3—3, 4—4, 5—5, and 6—6, are marked, engraved, stamped, or otherwise suitably formed on the template 18. These lines are tool shank and/or socket centerline indicia and are used in positioning the template during use as will be described later. The lines 0—0, etc. are perpendicular to the edge 21, so that the angle between the lines 0—0, etc. and the edges 19 and 20 is the angle of taper. Each line 0—0, etc., is spaced from a corner 22 or 23 a distance equal to half the diameter of the outer end of a socket of standard size. Each line 0—0, etc. may be marked, as shown with the number of the standard size shank with which the line corresponds. Thus, if the template 18 is designed for Morse standard size shanks, line 1—1 is spaced along edge 21 a distance of .238" from the corner 23, which distance is equal to one-half the diameter of a Morse No. 1 taper shank at the outer end of the corresponding socket. The lines 3—3 and 5—5 are spaced from the corner 23 at distances corresponding to Morse No. 3 and No. 5 tapers, respectively. The spacing of lines 0—0, 2—2, and 4—4 from the corner 22 similarly corresponds to the size of Morse No. 0, No. 2, and No. 4 tapers respectively. The line 6—6 is the centerline of the template 18 and corresponds to Morse No. 6 taper as will be explained. Thus, an entire set, e. g. of standard size Morse shanks, from No. 0 to No. 6 taper, may be incorporated in one template. Sets of standard size tool shanks of other manufacturers, such as Brown and Sharpe, similarly, may be incorporated in a single template. Odd numbered sizes have been shown as spaced from the corner 23 while even numbered sizes have been shown as spaced from the other corner 22 so that the template apertures, later described, may be spaced apart.

If the template 18 is not formed of a transparent material the lines, 0—0, etc. must be extended to the edge of the template opposite the edge 21 and duplicated on both sides of the template. It is preferred, however, to make the template transparent.

From the construction thus far described, it will be seen that the edge 21, from a centerline indicia line 0—0, etc. to the nearest corner 22 or 23, provides the outline characteristic, in elevation, of one-half of a cross-section of a standard size socket at the outer end thereof, while the corresponding edge 19 or 20, as the case may be, provides a straight line outline characteristic, a part of which corresponds to the outline characteristics in elevation of the uniformly tapered side of the socket. The outline characteristics of other portions of the tool shanks and/or sockets in the standard size set are provided by a series of template apertures 30, 31, 32, 33, 34, and 35, each of which is positioned with respect to a corresponding centerline indicia line 0—0, etc. All of the apertures, except 34 and 35, are spaced apart. Apertures 34 and 35 run together, but only along edges thereof that are not used as template guides, as later described.

The aperture 33, which is positioned with respect to line 3—3, will be described as indicative of the other apertures. The portion 40 of the edge of the aperture 33 is shaped to provide the outline characteristics in front elevation of that portion of the tongue 14 of a Morse No. 3 taper shank which lies on one side of the centerline thereof. The portion 40 accordingly is positioned correspondingly from the edges 20 and 21 of the template which, as previously described, provide outline characteristics of other portions of the tool shank, on the other side of the centerline thereof. An indicia line 41 is associated with the aperture 33 in position to correspond to the outline characteristics in front elevation of the other side of the tongue 14, i. e. the side opposite that with which the edge portion 40 corresponds.

The portion 42 of the edge of the aperture 33 provides the outline characteristic in front elevation of that portion of the keyway 13 of a Morse No. 3 taper socket which is on one side of the centerline and below the inserted tongue 14 of a corresponding tool shank 12. An indicia line 43 also is associated with the aperture 33 in position to correspond to the outline characteristics in front elevation of the top of the keyway 13. The shape of the apertures 30, 32, and 34, which are used with edge 19, are reversed with respect to the shape of apertures 31, 33, and 35, which are used with edge 20.

From the above description, it will be seen that with reference to any centerline indicia line 0—0, etc. the edge 19 or 20 provides a portion of the outline characteristics, in elevation, of one of the uniformly tapered sides of a tool shank and/or socket. The edge 21 provides the outline characteristics in elevation, on one side of the centerline, of a cross-section through the tool shank at the outer end of the corresponding socket, or stated in another manner, the outline characteristic in elevation of a cross-section through the outer end of the socket. It will be noted that both outline characteristics provided by either edge 19 or 20 and edge 21 are on one side of the centerline. The edge portion 40 of the apertures 30, 31, etc. provides outline characteristics in front elevation, on the other side of the centerline, of the tongue 14 of the tool shank. Thus, the template 18 provides a portion of the outline characteristics in front elevation of a machine tool shank on one side of the longitudinal centerline thereof and a portion on the other side of the centerline. These two outline portions, if continuous on one side of the centerline, would provide the complete outline characteristics on one side of the centerline. Because the two portions are on opposite sides of the centerline, however, after the portions are drawn, the template 18 is turned over and the remainder of the outline drawn. For example, to draw that portion of a Morse No. 4 taper shank which extends into a corresponding socket, the template 18 is used as shown in Figure 5. The separate lines drawn by using the various edges of the template as guides are shown disconnected for clearer illustration. In actual practice, they would be connected. The template is placed in position A with line 4—4 coinciding with the centerline C—C on the drawing paper about which the tool shank is to be drawn. Using the edges 19 and 21 of the template as guides and the various indicia lines as graduations, lines 51 and 52 are drawn, providing the outline characteristics in front elevation on one side of the centerline, of the tapered side of a Morse No. 4 taper tool shank and a cross-section through the shank at the outer end of the corresponding socket. With the template in the same position, and using portion 40 of the edge of aperture 34 as a guide, line 53 is drawn providing the outline characteristics, in elevation, of that portion of the tongue of the tool shank which lies on the opposite side of the centerline from lines 51 and 52. The template then is turned over and placed in position B. Lines 54, 55, and 56 then are drawn, using edges 19, 21, and aperture edge portion 40, to provide the balance of the tool shank outline on both sides of the centerline.

If it is desired to draw the socket keyway 13 in addition to the tool shank, the aperture edge portion 42 is used as a guide to draw line 57, when the template is in position A, and line 58, when the template is in position B. Lines 59 and 60 may be added by any conventional means to form the outline of the bottom of the socket. The template may then be turned around and the indicia line 43 aligned with lines 57 and 58. The curved part of the aperture edge portion 42 is then in position to be used as a guide in drawing the dotted line 61 which furnishes the outline characteristics in elevation of the top of the keyway.

If it is desired to draw that portion of the tool shank which extends out of the socket, the distance the shank extends out of the socket may be laid off on the centerline on the drawing paper above lines 52 and 55 and a line 62 perpendicular to the centerline drawn. The lines 51 and 54 then are extended to the line 62 by conventional means to complete the outline. For easy reference, the distance each standard size tool shank extends out of the socket may be stamped or otherwise suitably marked on the template adjacent each centerline indicia line 0—0.

The periphery of the template 18 provides a guide for drawing the largest size tool shank and/or socket in any set of standard sizes. The periphery, except the curved edge 63, provides the outline characteristics of that portion of a machine tool shank, except the bottom of the tongue, which extends into the corresponding socket. The curved edge 63 of the periphery provides the guide for drawing the bottom of the keyway. The edge 64 of the slot or aperture 65 provides a guide for drawing the outline characteristic in elevation of a portion of the bottom of the tongue, which portion may be completed with a straight edge. The template may be cut off along edge 64 and other means used to draw the outline of the bottom of the keyway, but I prefer to retain the curved edge 63 and the slot 65.

In all the views in the drawings, the outline guide edges of the template have been shown as exact size, that is, without taking into consideration tracing or drawing difficulties caused by the width of the pencil lines drawn by use of the template. It will be understood that if the periphery of the template is an exact outline of a tool shank or socket to be drawn, the drawing when completed will be slightly larger because of the width of the pencil lines. Similar difficulties arise when using the aperture edges as guides. The difficulty may be remedied by making the template periphery slightly smaller and similarly correcting the aperture edge portions. The difficulty also may be remedied by beveling all edges of an exact template on both sides as indicated at 66 in Figure 2. With all edges so beveled, the pencil or other drawing instrument used may be inclined from the vertical when drawing to place the point thereof slightly under the edge being used as a guide. The beveled edge method of correction is preferred.

It will be obvious that the template is susceptible to many changes and modifications which will not depart from the spirit of the invention. Accordingly, the scope of the invention is as set out in the following claims.

I claim:

1. A drafting template for drawing a plurality of different sizes of an article having a symmetrical shape about a centerline, the outline of said article on one side of the centerline thereof comprising a straight line and a second line having one end thereof lying on said centerline and the other end thereof connected to one end of said straight line, said template comprising: a plate having a straight edge; means defining a plurality of spaced parallel lines on said plate, one for each size of the article to be drawn, the spacing and orientation between each of said lines and said straight edge being the same as the spacing and orientation between the centerline of the article of corresponding size and the said straight line outline thereof, each of said parallel lines forming a separate indicium line for positioning the template to draw the article of that size which corresponds thereto; means defining a plurality of template apertures in said plate, one for each size of the article to be drawn and each associated with the indicium line for the article of corresponding size, a portion of the edge of each of said apertures defining said second line outline of the article of that size which corresponds thereto, said edge portion being located on that side of the said associated indicium line opposite said straight edge, the said associated indicium line intersecting said edge portion at that point thereof which defines one end of said second line outline and said associated indicium line bisecting the distance between said straight edge and that point on said edge portion which defines the other end of said second line outline.

2. A drafting template for drawing a plurality of different sizes of an article having a symmetrical shape about a centerline, the outline of said article on one side of the centerline thereof comprising a first straight line, a second straight line having one end thereof lying on said centerline and the other end thereof connected to one end of said first straight line, and a third line having one end thereof lying on said centerline and the other end thereof connected to the other end of said first straight line, said template comprising: a plate having two straight edges meeting at an angle equal to that between said first and second straight line outlines of said article and forming a corner; means defining a plurality of spaced parallel lines on said plate, one for each size of the article to be drawn, said parallel lines intersecting one of said straight edges and being spaced therealong, each of said parallel lines forming a separate indicium line for positioning the template to draw the article of that size which corresponds thereto; means defining a plurality of template apertures in said plate, one for each size of the article to be drawn and each associated with the indicium line for the article of corresponding size, a portion of the edge of each of said apertures defining said third line outline of the article of that size which corresponds thereto, said edge portion being located on that side of the said associated indicium line opposite said other of said straight edges, the said associated indicium line intersecting said edge portion at that point thereof which defines one end of said third line outline, the distance between said point and the intersection of said associated indicium line and said one straight edge being equal to the centerline length of the article of corresponding size, and the said associated indicium line bisecting the distance between said other straight edge and that point on said edge portion which defines the other end of said third line outline.

RAYMOND H. MECKLEY.

REFERENCES CITED

The following references are of record in the file of this patent:

UNITED STATES PATENTS

| Number | Name | Date |
|---|---|---|
| D. 138,342 | Gilardi | July 18, 1944 |
| D. 147,743 | Cambron | Oct. 28, 1947 |
| 1,315,333 | Roads | Sept. 9, 1919 |
| 1,544,327 | Lowenthal | June 30, 1925 |
| 1,697,149 | Danly | Dec. 18, 1928 |
| 1,879,624 | Lockwood | Sept. 27, 1932 |

Certificate of Correction

March 22, 1949.

Patent No. 2,465,167.

RAYMOND H. MECKLEY

It is hereby certified that errors appear in the printed specification of the above numbered patent requiring correction as follows:

Column 2, line 40, before the word "shank" insert *tool*; column 5, line 39, for "0—0." read *0—0, etc.*; column 8, line 12, list of references cited, for "1,697,149" read *1,696,149*;

and that the said Letters Patent should be read with these corrections therein that the same may conform to the record of the case in the Patent Office.

Signed and sealed this 30th day of August, A. D. 1949.

[SEAL]

THOMAS F. MURPHY,
*Assistant Commissioner of Patents.*